United States Patent [19]
Berroteran

[11] Patent Number: 6,002,405
[45] Date of Patent: Dec. 14, 1999

[54] METHOD FOR CREATING A GRAPHIC WORK USING A FIVE POINT PERSPECTIVE SYSTEM AND A GRAPHIC WORK PRODUCED BY THE METHOD

[76] Inventor: Abelardo Berroteran, 3955 Ventura Way, Las Vegas, Nev. 89121

[21] Appl. No.: 08/972,459

[22] Filed: Nov. 15, 1997

Related U.S. Application Data

[60] Provisional application No. 60/031,006, Nov. 15, 1996.

[51] Int. Cl.[6] ................................................ G06T 17/00
[52] U.S. Cl. ............................................ 345/419; 345/427
[58] Field of Search .................................. 345/419, 420, 345/425, 427–443

[56] References Cited

U.S. PATENT DOCUMENTS

| | | | |
|---|---|---|---|
| 5,276,613 | 1/1994 | Schlumberger | 364/413.16 |
| 5,388,059 | 2/1995 | DeMenthon | 364/559 |
| 5,581,637 | 12/1996 | Cass et al. | 382/284 |
| 5,748,194 | 5/1998 | Chen | 345/427 |

OTHER PUBLICATIONS

Horaud et al. "Computer Vision, Graphics, and Image Processing" pp. 34–44, 1989.

*Primary Examiner*—Almis R. Jankus
*Attorney, Agent, or Firm*—Philip J. Anderson; Quirk & Tratos

[57] ABSTRACT

A method is set forth for fashioning graphic works with perspective based upon five perspective points. The method includes selecting axes X, Y which extend to vanishing points A–D and cross at a fifth reference point Z. By using lines extending to the vanishing points A–D and the center point Z a perspective grid can be fashioned the spacing of the points and reference lines of the grid defined by the five points of the perspective. The grid can be fashioned to provide a "bulging" perspective or a "tunnel" perspective. Also set forth are works produced by the method.

6 Claims, 5 Drawing Sheets

METHOD FOR CREATING A GRAPHIC WORK USING A FIVE POINT PERSPECTIVE SYSTEM AND A GRAPHIC WORK PRODUCED BY THE METHOD

This application claims benefit of provisional application Ser. No. 60/031,006 filed Nov. 15, 1996.

FIELD OF THE INVENTION

The present invention relates to methods for creating on a substrate such as a flat surface, a graphic work having the appearance of perspective.

BACKGROUND

Graphic artists have long incorporated some elements of perspective into works such as architectural drawings and the like. Typically the artist selects a horizontal horizon for the work as well as vanishing points at the ends of the horizon line. Using the horizon line as a baseline for the work and the two vanishing points, the artist draws the vertically oriented aspects of the work vertical, with reference to the horizon, with the horizontal aspects of the work directed toward the vanishing points. With reference to a vertical centerline for the building or other objects in the drawing, the horizontal aspects of the drawing on the right side of the centerline will be directed toward the right side vanishing point with the horizontal aspects o on the left side directed toward the left side vanishing point. Rounded objects such as circles or ovals are likewise conformed, in a known fashion, to the perspective of the work by, for example, having their horizontal axes directed toward the appropriate vanishing point.

Engineering perspective drawings as well paintings and renderings often incorporate perspective of the type described above.

While using the perspective technique described gives a perspective of depth to a drawing presented on a flat surface such as a sheet of paper, the work does not have a perspective to give the work a desirable and striking three-dimensional appearance similar to that provided by holograms or the like. What is needed is a method for producing a work which provides a three-dimensional appearance similar to that produced by holographic techniques, which is suitable to any form of graphic or artistic work, which is particularly suitable to providing a three-dimensional "tunnel" effect, which is adapted for use in computerized graphic systems and which is easy to use.

SUMMARY OF THE INVENTION

There is, therefore, set forth according to the present invention a method for creating an art work having three-dimensional perspective which is relatively easy to create, which is susceptible to computer graphics systems and which produces results which can be as striking, from a depth perspective standpoint, as a hologram.

Toward this end a method is set forth for fashioning on a flat or substantially flat surface a two-dimensional work having perspective which includes fashioning the work to have its perspective elements conform to reference lines of a grid defined by the steps of:
 (i) defining orthoginal axes X, Y crossing at a center point Z, the axes directed to at least to vanishing points A,B, one for each axis,
 (ii) selecting at least two points X1, Y1 equidistant from the center Z along the X and Y axes respectively, these points selected to define the outer bounds for the grid;
 (iii) establishing additional points along the X and Y axes and reference lines therefrom by,
  (a) from each of the points X1,Y1 directing reference lines to each vanishing point A,B, said reference lines crossing at a first reference point, the first reference point and points Y1, X1, Z defining a reference box;
  (b) extending a diagonal line from point Z through the first reference point and from Point X1 to point Y1, the diagonal lines crossing at a second reference point,
  (c) extending reference lines through the second reference point to vanishing points A,B, these reference lines intersecting the X and Y axes to establish points X2, Y2 thereon and define four reference sub-boxes,
  (d) repeating steps (b)–(c) to define additional points along the X and Y axes, said points along the X and Y axes and the reference lines extending therefrom to the vanishing points A,B defining said grid.

By fashioning the work to have its perspective elements conform to the reference lines, i.e. vertical lines conform to vertical reference lines and horizontal lines conform to horizontal reference lines of the grid, the work is provided with a unique perspective.

In another aspect of the method of the present invention, the work can be fashioned to exhibit a perspective, tunnel-effect by drawing the perspective elements of the work to conform to reference and points of a grid defined by the steps of:
 (i) defining orthoginal axes X, Y crossing at a center point Z, the axes directed to at least to vanishing points A,B,
 (ii) selecting at least two points X1, Y1 equidistant from the center Z along the X and Y axes respectively, these points selected to define the outer bounds for the grid;
 (iii) establishing reference lines for the grid by,
  (1) extending reference lines through the points X1, Y1 to the vanishing points A, B, said reference lines crossing at a first reference point,
  (2) extending diagonal lines through the reference box, these diagonal lines crossing at a second reference point,
  (3) extending reference lines from the second reference point to the vanishing points A,B, these reference lines intersecting at second reference point and the X and Y axes at points X2, Y2, the first and second reference points, X2 and X1 defining a tunnel wall,
  (4) extending a diagonal lines across the wall, these diagonals crossing at a third reference point,
  (5) from the third reference point extending a reference line to vanishing point A and to intersect axis X at point X3 and a reference line to point Z to divide the wall into four panels and defining a third reference point,
  (6) repeating the steps (4)–(5) to define additional reference lines and points for the grid, said grid providing the work with a tunnel perspective.

Also set forth are works prepared according to the methods of the present invention.

The method of the present invention is adapted to be incorporated into computer based graphics systems. By appropriately programming the computer, the aforementioned reference grids can be created and the work manipulated to conform to the five point perspective defined thereby.

BRIEF DESCRIPTION OF THE DRAWINGS

These and other features and advantages of the present invention will become better appreciated as the same becomes understood with reference to the description, claims and drawings wherein:

DESCRIPTION

Figure 1:
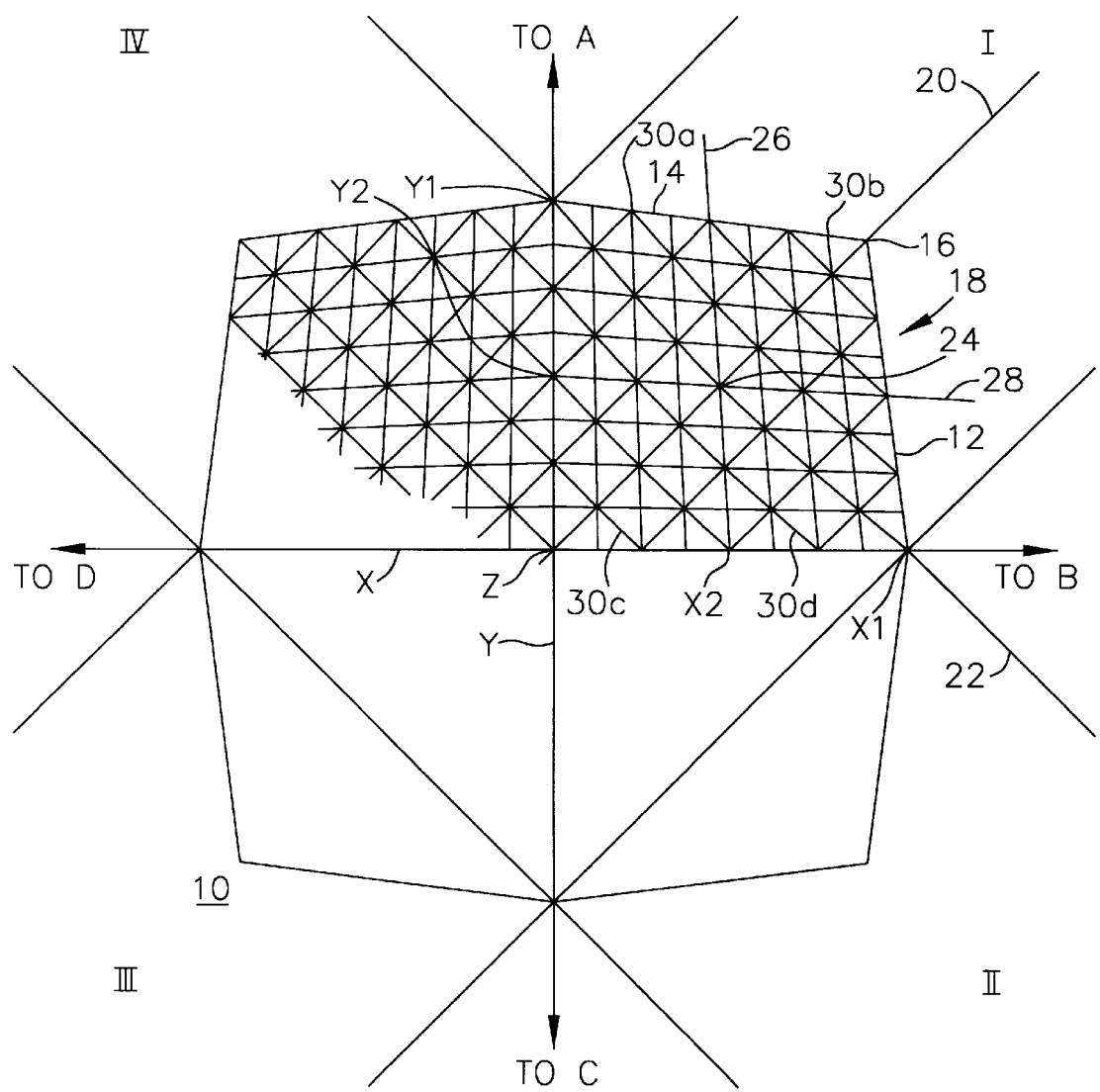
FIG. 1 illustrates the method of the present invention for fashioning a grid including reference lines adapted for conformance with the perspective elements of a work to be fashioned thereon.

Turning to the drawings, FIG. 1 illustrates the arrangement of certain reference lines adapted for the creation of a work according to the method of the present invention. These reference lines are shown for purposes of explanation in that in a graphic work the reference lines would not appear. Rather, the perspective aspects of the work such as boundary lines for the work, corners, horizontal and vertical aspects of the work as hereinafter defined are disposed to conform or align with these imaginary, but depicted, reference lines which are positioned according to the present invention to provide the desired three-dimensional effect.

On the surface 10, which may be a piece of paper, canvas or other substantially flat surface, the method of the present invention includes providing orthogonal axes X, Y which cross at a perspective center point Z. The center point Z will typically be at the center of the work; however it should be understood that the center point Z could be offset to one side or the other or above or below the position for the intended work. Axis X defines the horizontal reference line for the work and axis Y the vertical. Axis Y extends in either direction in FIG. 1 between vanishing points A,C whereas axes X extends in either direction between vanishing points B,D. In that the vanishing points A–D are located remote from the center Z they are not shown in FIG. 1. Each of the vanishing points A–D is located equidistant from the center point Z. The vanishing points A–D and center point Z define the five point perspective for the work. By bringing the vanishing points A–D closer to the center point Z, the perspective for the work will be more enhanced exhibiting a bulging effect. The crossing axes X, Y define four quadrants I–IV for the grid.

To illustrate the creation of reference lines and the method of the present invention, the construction of a grid of reference lines will now be described with continuing reference to FIG. 1. While the creation of only a small number of reference lines are shown and described located in quadrant I, it is to be understood that the number and resolution of the grid lines could be increased and that the grid would be likewise provided in each quadrant I–IV where the perspective aspects of the work would be found.

To space points and reference lines along the X and Y axes to define a perspective grid, two start points X1, Y1 are located equidistant from the center point Z along the X and Y axes, respectively. From each of the start points X1, Y1 reference lines 12, 14 are extended to vanishing points A and B, reference lines 12, 14 crossing at reference point 16. The axes X, Y, reference lines 12, 14 and points Z, Y1, 16, X1 define a first reference box 18 for the grid. Reference line 20 extends from center Z through reference point 16. Reference point 16, reference lines 12, 14 and 18 provide the foundation for the spacing of points for the creation of the grid according to the present invention.

To space the reference lines for the grid and the points along the X and Y axes, a diagonal line 22 is disposed to cross the first reference box 18 from X1 to Y1, the diagonals 22 and 20 crossing at a second reference point 24. Through the second reference point 24 reference lines 26, 28 are directed, respectively, to vanishing points A, B which not only divides the first reference box 18 into four reference sub-boxes 30a–d but also these lines intersect the axes X and Y at points X2, Y2.

Figure 2:
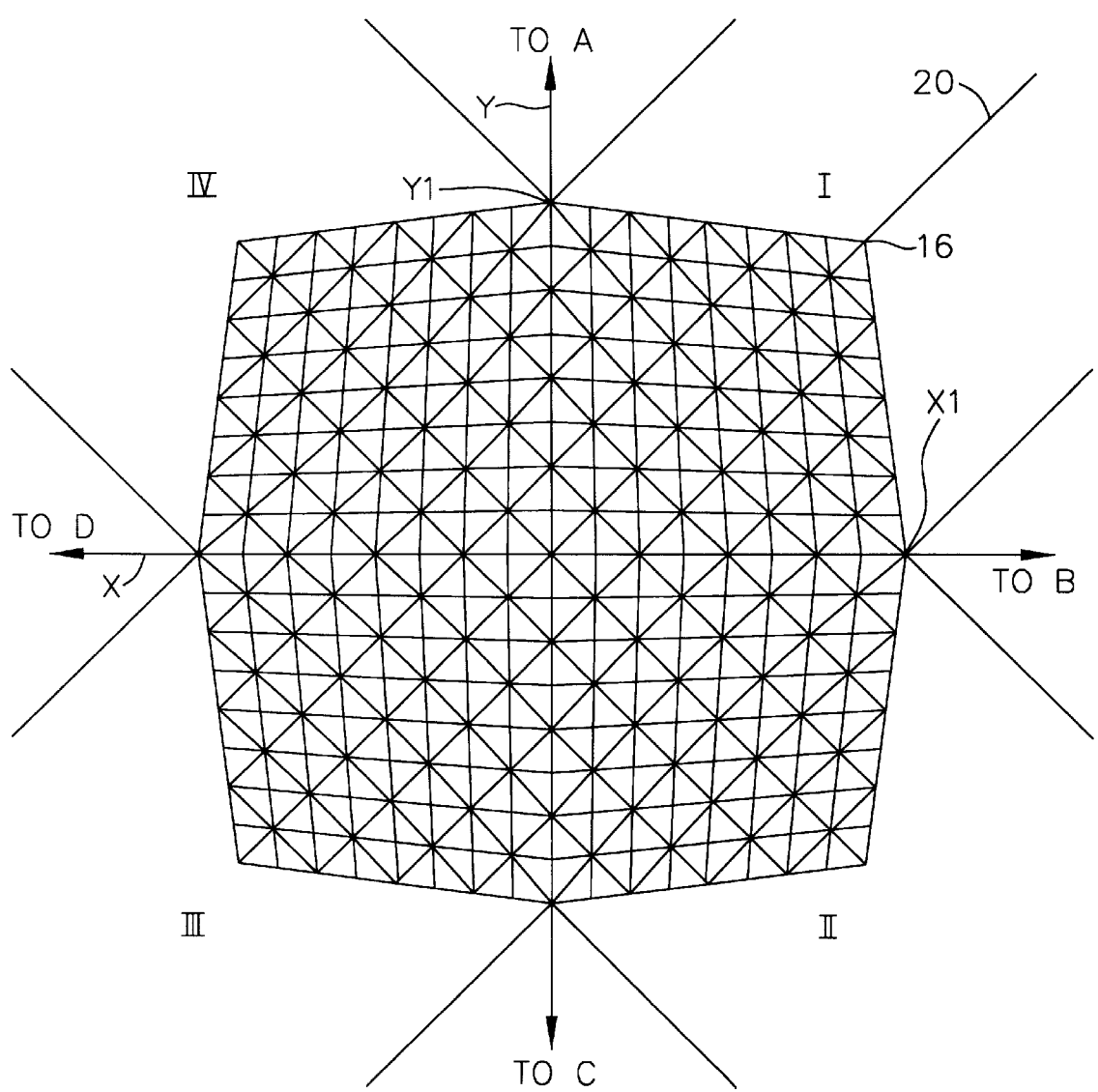
FIG. 2 illustrates a grid fashioned according to the method of FIG. 1 the lines of which are used for conforming the perspective elements of a work.

Additional reference lines and points along axes X, Y are defined in a like manner. For example, diagonal lines are provided in each reference sub-box which cross at additional reference points. From these additional reference points, reference lines are struck to the vanishing points A, B which intersect the axes X, Y defining additional points thereon and additional reference lines for the grid. By continuing with this process the desired spacing of reference lines and points for the grid can be defined with the desired degree of resolution. Further, with reference to FIG. 2, it can be seen that an entire grid can be defined according to this method. By drawing the work with its perspective elements such as vertical and horizontal lines corresponding and conforming to the reference lines and the dimensional aspects conforming to the spacing of the reference lines, the perspective work can be created. The perspective work drawn to conform to the grid will be based upon the five points of perspective in that the reference lines extend to the vanishing points A–D and the spacing of the reference lines is initiated by reference line 20 extending from center point Z.

Figure 3:
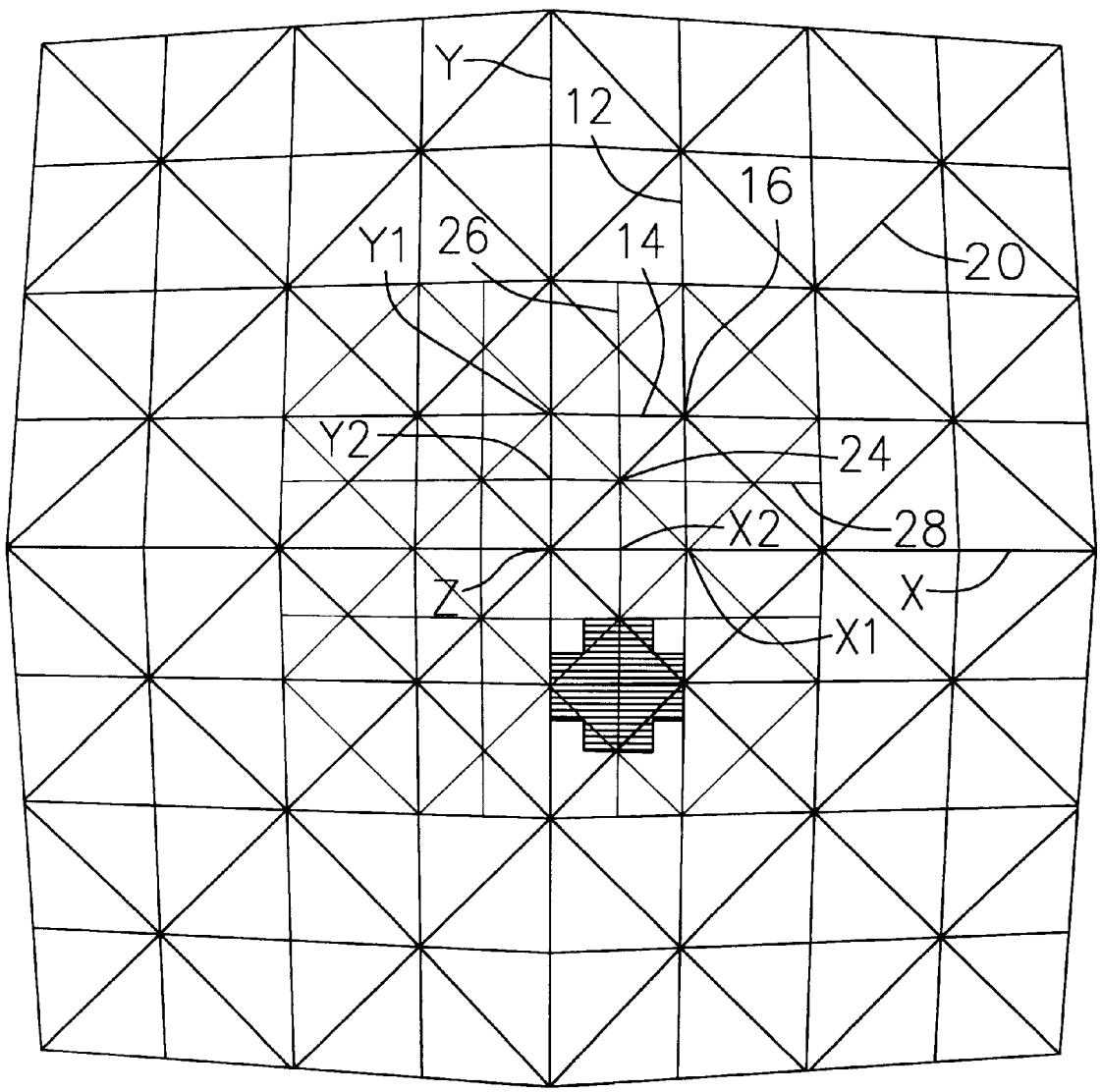
FIG. 3 is a partial view of the grid of FIGS. 1 and 2 illustrating conformance of the perspective elements of a work.

With reference to FIG. 3 a partial view of a grid according to the method described is shown with a work 32, shown as a cross, fashioned in accordance therewith. The work 32 has what would normally be horizontal and vertical elements now conforming to reference lines of the grid fashioned according to the present invention. The work 32 will appear to bulge out from the surface 10 when its perspective elements are fashioned to conform to the reference lines of the grid. While not shown, circles and ovals would likewise be fashioned according to the reference lines of the grid by appropriately arranging their axes.

Returning to FIG. 1 it can be seen that the expansion of the grid to the other quadrants II–IV merely requires the selection of additional points X1', Y1' and following the method described above. Points X1, X1', Y1, Y1' would all be equidistant from the center point Z.

Figure 4:
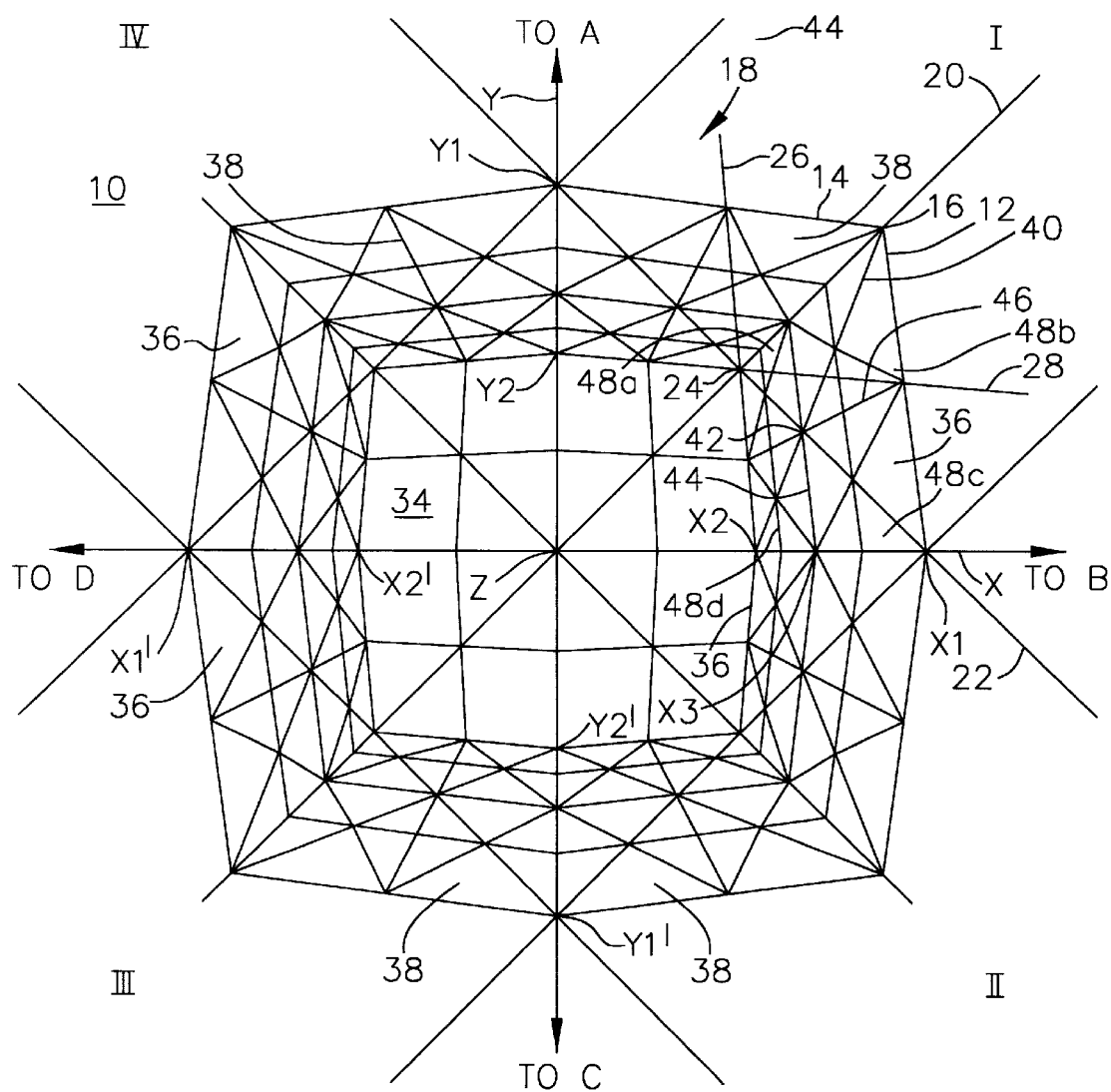
FIG. 4 is a view of a further embodiment of the method for establishing grid lines for a work to provide he work with a tunnel perspective.

Turning to FIG. 4 a further embodiment of the method of the present invention will now be described. According to this embodiment, a grid is fashioned to provide a word conforming thereto with a tunnel perspective.

As with the method described above, orthoginal axes X, Y are provided which cross at center point Z. Axes X, Y extend to vanishing points A–D and define quadrants I–IV on the surface 10. With reference to only quadrant I, points X1 and Y1 are selected along the axes X, Y, respectively, equidistant from point Z and at a desired distance from the center point Z to provide a grid of a size sufficient to encompass the graphic work. From each point X1, Y1 reference lines 12, 14 are directed to vanishing points A, B and cross at a first reference point 16. Points Z, Y1, 16, X1 define a first reference box 18 in quadrant I.

A diagonal reference line 20 is drawn from point Z to point 16 and a diagonal line 22 is drawn between point X1 and point Y1, the reference line 20 and diagonal line 22 intersecting at a second reference point 24. Reference lines 26, 28 are drawn through the second reference point 24 to vanishing points A, B intersecting the axes X, Y at new points X2, Y2. Points X2, Z, Y2, 24 define a quadrant for what will appear to be the bottom or opening 34 of the tunnel perspective. Also points X2, 24, 16, X1 define a wall 36 for the tunnel perspective. As can bee seen there are defined in a like manner in the all quadrants I–IV, if so desired, like walls 36 as well as ceilings and floors 38 for the tunnel perspective.

To define additional reference lines and points for the wall 36, a diagonal line 40 is extended across the wall 39 between points X2 and 16 crossing diagonal line 22 at a third reference point 42. Through the third reference point 42 a reference line is extended to vanishing point A and to intersect the axis X at new point X3. Additionally a reference line 46 from center point z is extended through the third reference point 42 dividing the wall 36 into four panels 48a–d. Each of these panels can then be divided in a similar fashion by crossing diagonal lines defining additional reference points through with reference lines are projected to define additional points on axis X with the reference lines extending therethrough. Further by extending reference lines from center point Z through these reference points reference lines for the horizontal perspective aspects of the work can be spaced and defined.

Accordingly, the reference lines defined by the spacing along axis X are used to conform the vertical perspective aspects of a work where the reference lines from the center point Z are used to conform the horizontal aspects.

Figure 5:
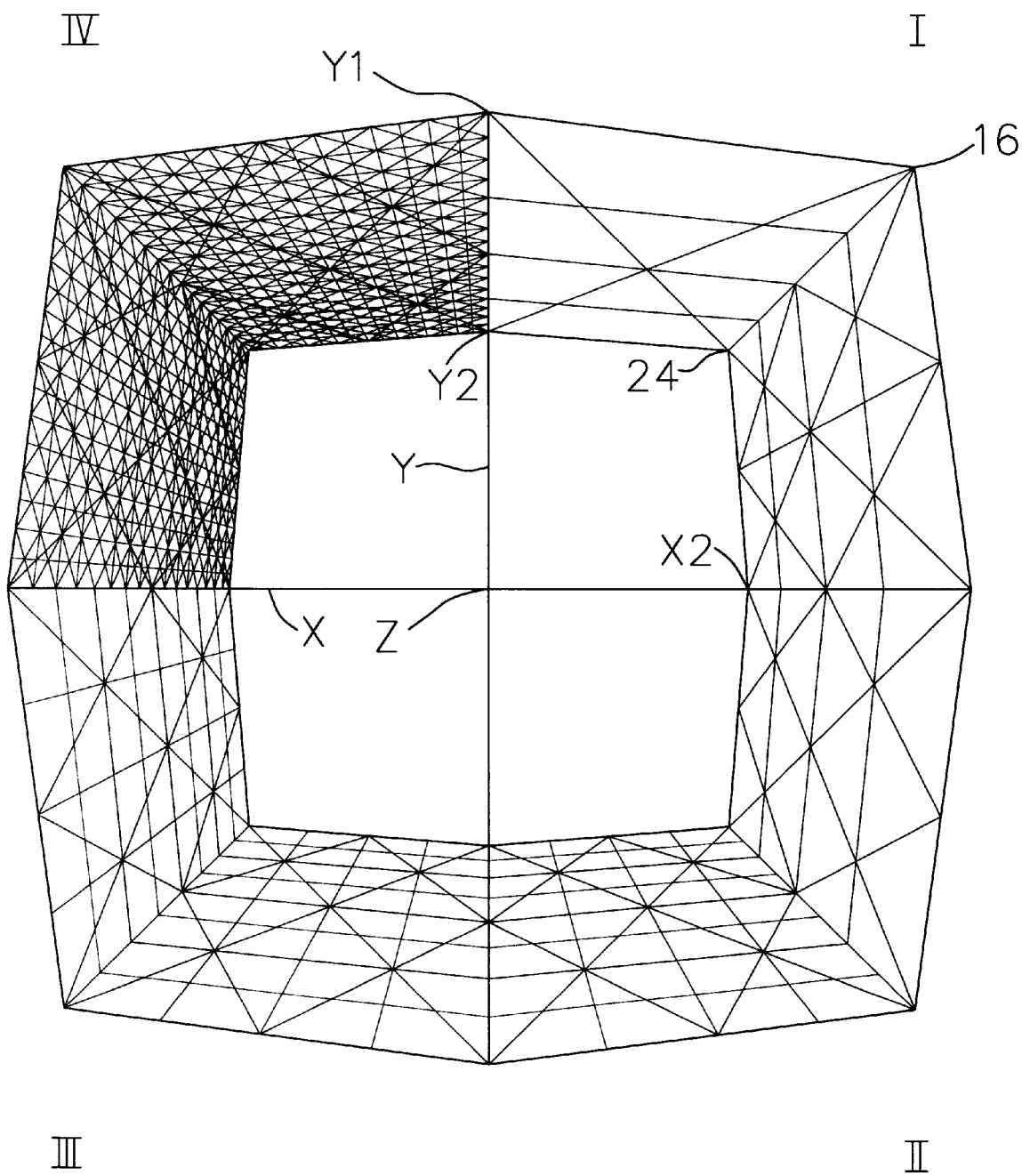
FIG. 5 illustrates the grid lines of FIG. 4 showing the resolution grid lines.

With reference to FIG. 5 the tunnel effect grid is shown with the grid in quadrant IV having reference lines defined according to the method of the present invention. As can be appreciated, the reference lines themselves provide a tunnel perspective. As can further be appreciated, by drawing a graphic work to conform the reference lines of the grid, the work will be provided with a tunnel effect perspective.

While I have shown certain methods for fashioning a work having perspective using a work surface such as paper or a canvas, it is to be understood that the technique could also be programmed into a computer to provide for computerized graphics. For example, the user would only have to select the resolution, size and starting points and the processor would construct the grid or conform a graphics work to the reference lines defined by the grid to create works of art with perspective.

While I have shown and described certain embodiments of the present invention it is to be understood that it is subject to many modification and variations without departing from the spirit and scope of the inventions set forth in the claims.

I claim:

1. A method for fashioning a two-dimensional graphic work with perspective comprising:
   (A) fashioning the work to have its perspective elements conform to reference lines of a grid; and
   (B) providing said grid by the steps of,
   (i) defining orthoginal axes X, Y crossing at a center point Z, said axes directed to at least to vanishing points A,B,
   (ii) selecting at least two points X1, Y1 equidistant from the center Z along the X and Y axes respectively, said points selected to define the outer bounds for the grid;
   (iii) establishing additional points along the X and Y axes by,
     (a) from each of the points X1,Y1 directing reference lines (12, 14) to each vanishing point A,B, said reference lines crossing at a point (16), said points Y1, (16), X1, Z defining a reference box;
     (b) extending a diagonal line (20) from point Z through point (16) and from Point X1 to point Y1, said diagonal lines crossing at a reference point (24),
     (c) extending reference lines through the reference point (24) to vanishing points A,B, said lines intersecting the X and Y axes to establish points X2, Y2 thereon and define four reference sub-boxes,
     (d) repeating steps (b)–(c) to define additional points along the X and Y axes, said points along the X and Y axes and the reference lines extending therefrom to the vanishing points A,B defining said grid.

2. A graphic work fashioned according to the method of claim 1.

3. A method for fashioning a two-dimensional graphic work with perspective comprising:
   (A) fashioning the work to have its perspective elements conform to reference lines of a grid; and
   (B) providing said grid by the steps of,
   (i) defining orthoginal axes X, Y crossing at a center point Z, said axes directed to vanishing points A–D,
   (ii) selecting at least two points X1, X1', Y1, Y1' equidistant from the center Z along the X and Y axes respectively, said points selected to define the outer bounds for the grid, said crossing axes defining quadrants I–IV for the grid;
   (iii) establishing additional points along the X and Y axes by,
     (a) from each of the points X1, X1', Y1, Y1' directing reference lines to vanishing points A–D, said reference lines crossing at first points (16) in each quadrant, said first reference points (16) and said axes X, Y defining reference boxes for the grid;
     (b) extending a diagonal lines (20, 22) through each reference box, said diagonal crossing at second reference points (24),
     (c) extending reference lines through each second reference point to vanishing points A–D said lines intersecting the X and Y axes to establish points X2, X2', Y2, Y2' thereon and define sixteen reference sub-boxes,
     (d) repeating steps (b)–(c) to define additional points along the X and Y axes, said points along the X and Y axes and the reference lines extending therefrom to the vanishing points A–D defining said grid.

4. A graphic work fashioned according to the method of claim 3.

5. A method for fashioning a two-dimensional graphic work having perspective comprising;
   (A) fashioning the work to have its perspective elements conform to reference lines of a grid; and
   (B) providing said grid by the steps of,
   (i) defining orthoginal axes X, Y crossing at a center point Z, said axes directed to at least to vanishing points A,B,
   (ii) selecting at least two points X1, Y1 equidistant from the center Z along the X and Y axes respectively, said points X1,Y1 selected to define the outer bounds for the grid;

(iii) establishing reference lines for the grid by,
  (1) extending reference lines through the points X1, Y1 to the vanishing points A, B, said reference lines crossing at a first reference point (16), said reference point (16), and points Y1, Z, X1 defining a reference box;
  (2) extending diagonal lines (20, 22) through the reference box, said diagonal lines crossing at a second reference point (24),
  (3) extending reference lines from the second reference point (24) to the vanishing points A,B, said reference lines intersecting axes X, Y at points X2, Y2, said points X2, (24), (16) and X1 defining a wall,
  (4) extending a diagonal lines across the wall, said diagonals crossing at a third reference point (42),
  (5) from the third reference point (42) extending a reference line to vanishing point A and to intersect axis X at point X3 and a reference line to point Z to divide the reference box into four sub-boxes,
  (6) repeating the steps (4)14 (5) to define additional reference lines and points for the grid, said grid providing the work with a tunnel perspective.

6. A graphic work prepared according to the method of claim 5.

\* \* \* \* \*